(No Model.)
J. F. WALTROUS.
CULTIVATOR.
No. 491,618. Patented Feb. 14, 1893.
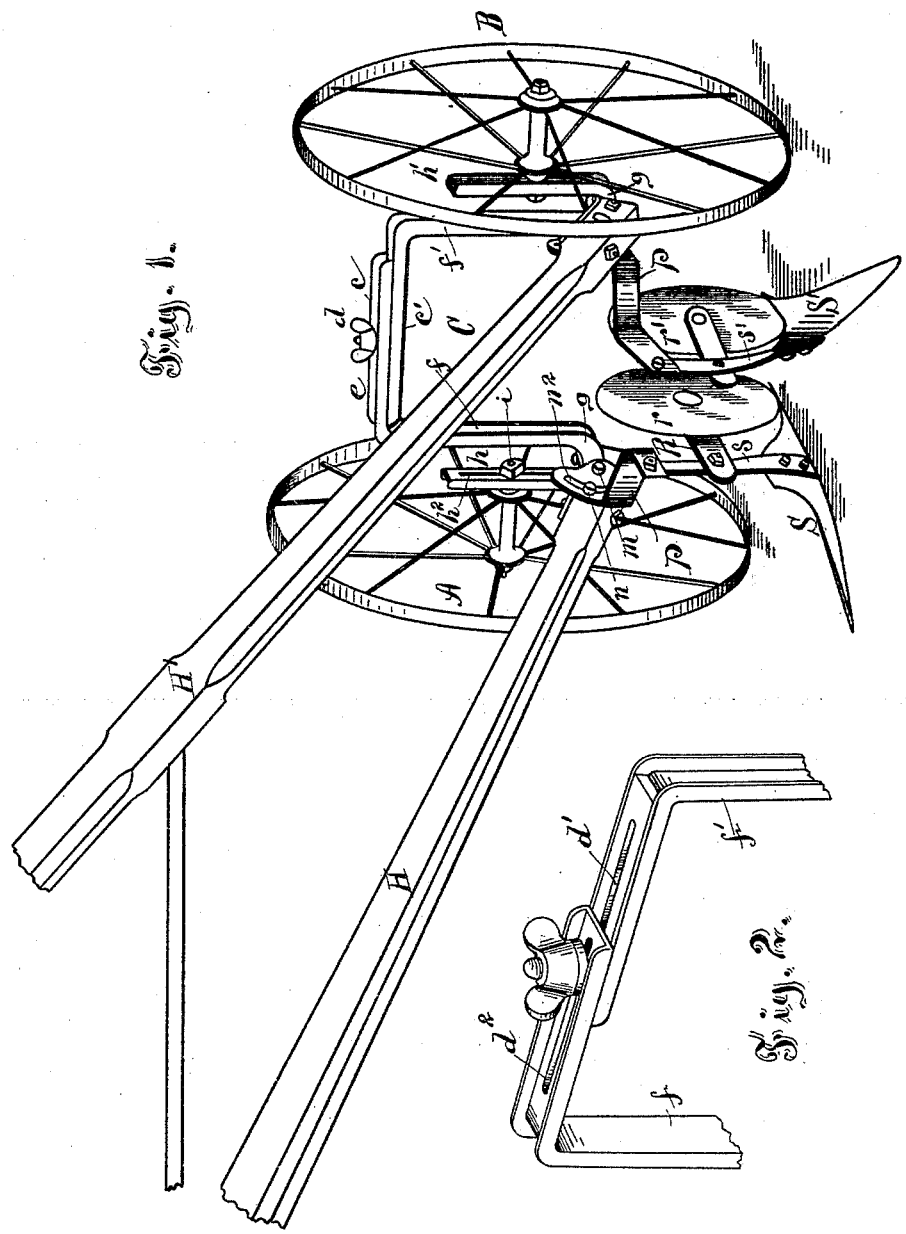
WITNESSES
F. Clough
W. W. Bradford
INVENTOR
John F. Waltrous
by Parker & Burton
Attorneys.

UNITED STATES PATENT OFFICE.

JOHN F. WALTROUS, OF CHELSEA, MICHIGAN.

CULTIVATOR.

SPECIFICATION forming part of Letters Patent No. 491,618, dated February 14, 1893.

Application filed July 14, 1892. Serial No. 439,991. (No model.)

*To all whom it may concern:*

Be it known that I, JOHN F. WALTROUS, a citizen of the United States, residing at Chelsea, county of Washtenaw, State of Michigan, have invented a certain new and useful Improvement in Cultivators; and I declare the following to be a full, clear, and exact description of the invention, such as will enable others skilled in the art to which it pertains to make and use the same, reference being had to the accompanying drawings, which form a part of this specification.

This invention relates to cultivators, and has for its object an improvement in the small hand cultivator adapted to be used by pushing the same before the workman.

My improvement is designed especially to produce a cultivator with which the workman can straddle the row of vegetables under cultivation and loosen up the soil on both sides of the row at the same time.

One principal object of the improvement is to enable the workman to widen out or narrow up the cultivator, as he may desire.

Another object is to enable the workman to set the cutting blades at any desired angle to the handles by means of which he operates the cultivator, thus enabling him to make a deep or shallow cut, as he may desire.

Other purposes and objects will be more fully described hereinafter.

This cultivator is mounted upon small light wheels which support the blades at a definite point with respect to the surface of the ground and render the operation of the cultivator much lighter and easier.

In Figure 1, the cultivator is shown in perspective. Fig. 2 shows an enlarged detail of the two part axle.

A and B represent the supporting wheels united by an adjustable axle C of peculiar form. The axle C is made in two parts, $c$ and $c'$, and the two parts $c$ and $c'$ are united by a bolt and thumb nut $d$, which passes through the slots $d'$ and $d^2$. Each part of the axle $c$ and $c'$ is bent three times at right angles or nearly at right angles. The cross bars $e$ and $e'$ are horizontal. From each cross bar $e$, a vertical part $f$, $f'$, drops below the hub of the wheel A, bends outward with a short horizontal piece $g$, and returns upward past the hub of the wheel with a vertical piece $h$. The combined axle thus forms both a drop axle and an elevated yoke adapted to cross from one wheel to the other above the tops of the plants to be treated by the cultivator. The vertical piece $h$ is provided with a long vertical slot $h^2$, through which passes a holding bolt $i$, by means of which the axle is secured to the wheel. The vertical slot $h^2$ enables the axle to be adjusted vertically with respect to the wheel.

To the short horizontal part $g$ of the axle, I attach the handle H, and upon the handle H is secured the holding iron P, which supports the cultivator point or share, S. The supporting arm or iron P is secured to the cultivator handle by pin or bolt $m$, upon which it can turn, and it is adjusted by turning the arm P around the bolt $m$ and securing the parts in the desired position by means of the holding bolt $n$ passing through the arched holding slot $n^2$. Between the arm P and the cultivator point S is a standard $s$, and to the standard is secured by bolts or in any other suitable way, an arm R that extends forward and supports at its forward end a circular guard plate $r$. The object of the circular guard plate $r$ is to prevent the cultivator point S from striking or injuring the plant.

By means of the adjustable yoked axle C, the cultivator points S, S', and the guard plates $r$, $r'$, may be adjusted close together, or as far apart as may be desired. By means of the slot $h^2$ in the vertical portion $h$ of the axle, the depth of the cut of the points may be adjusted as high or as low as may be desired; and by means of the adjustment of the point S and its supporting arms around the bolt $m$, the angularity of the point S may be adjusted as may be desired. This last adjustment is especially desirable to accommodate the implement to the use of workmen of various heights, as one workman may desire to operate the implement from a higher point than another workman, and the adjustment to accomplish this result is produced by turning the cultivator point around the bolt $m$ and securing it in proper place by the bolt $n$.

It is to be noticed that the operating handles H, H', are secured to the axle below the hubs of the wheels, thus balancing the implement much better than when the handles are secured on the plane with the hubs of the wheels.

What I claim is—

1. In combination with the wheels of a hand cultivator, an arched axle rising at its middle point above the plane of the hub, and dropping at each end near the hub, below the plane of the hubs, and provided at the ends with upturned parts, adapted to engage with the hubs, operating handles and cultivator points adjustably secured to said arched axle below the plane of the hubs, substantially as and for the purpose described.

2. In a hand cultivator, the combination of supporting wheels an arched dropped axle provided with slotted vertical ends, and made in two parts slidingly secured together at the arch, operating handles secured to said axle at the drop part thereof, cultivator points, adjustable through an angle with respect to said handles, substantially as and for the purpose described.

In testimony whereof I sign this specification in the presence of two witnesses.

JOHN F. WALTROUS.

Witnesses:
T. E. WOOD,
H. M. WOODS.